Figure 4:
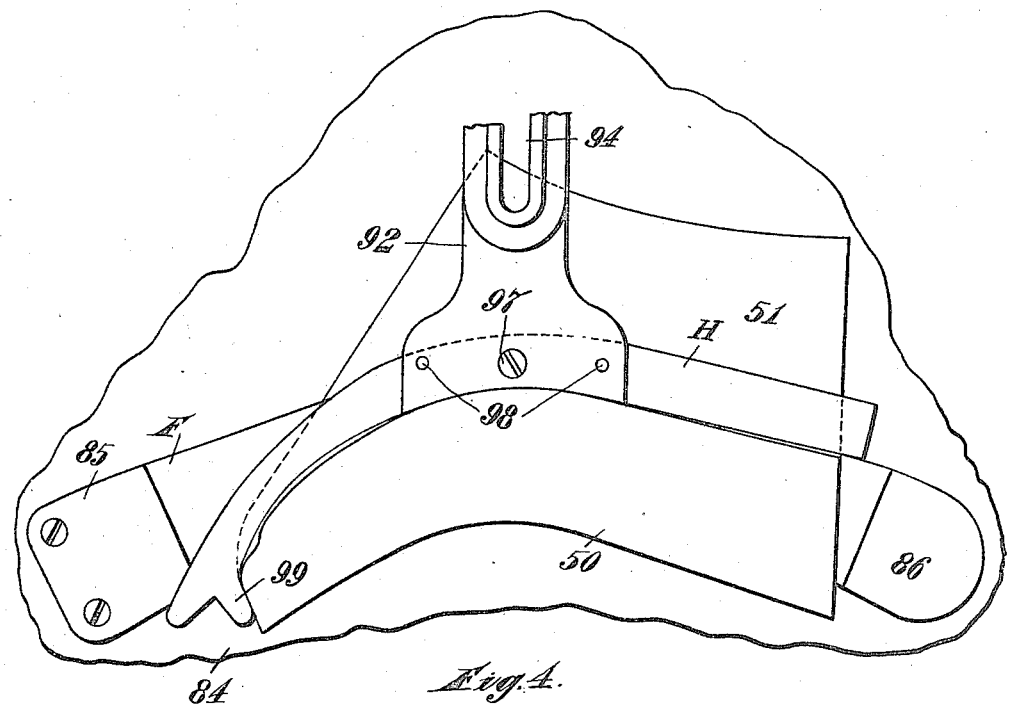

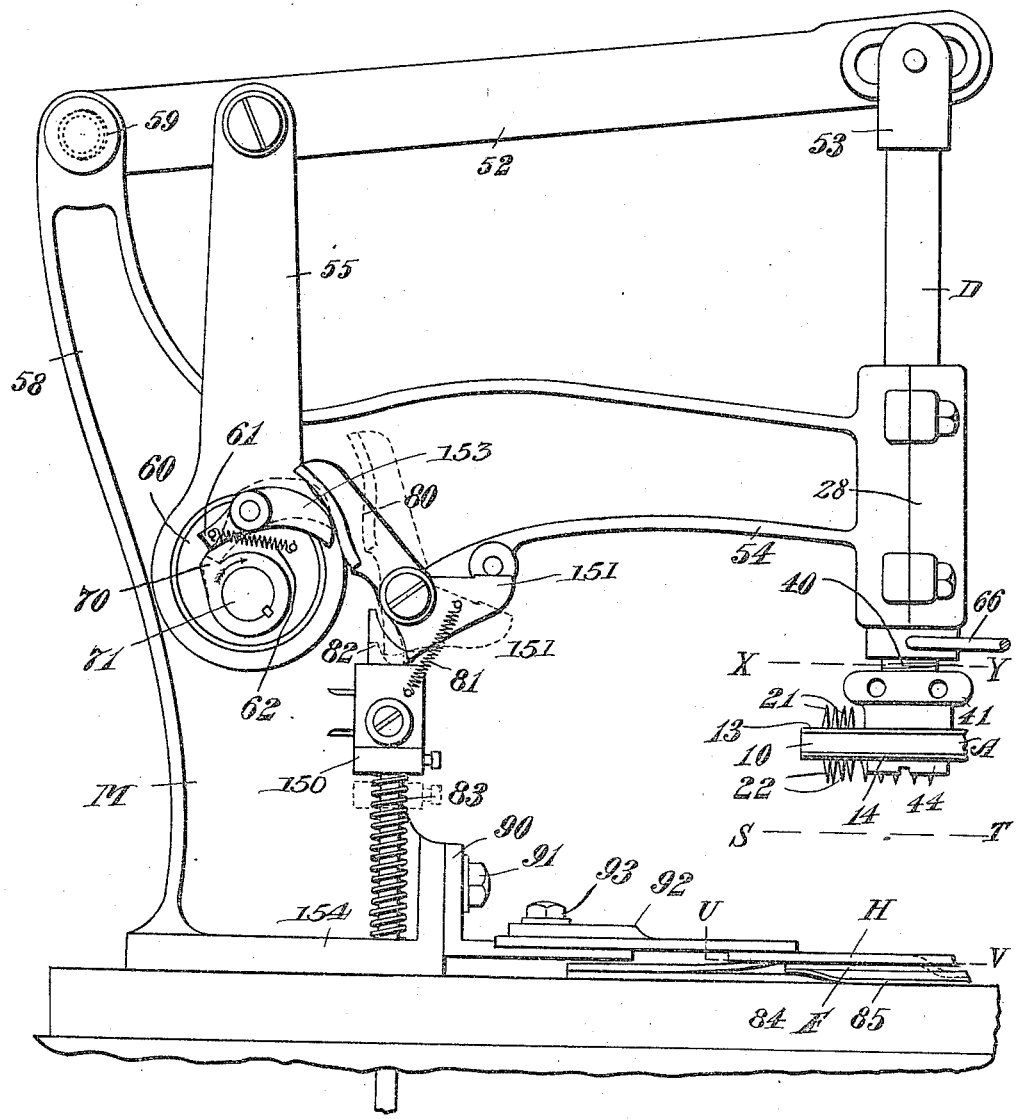

J. J. CASEY.
MARKING MACHINE FOR SHOE UPPERS.
APPLICATION FILED DEC. 19, 1913.
1,183,432.
Patented May 16, 1916.
6 SHEETS—SHEET 2.
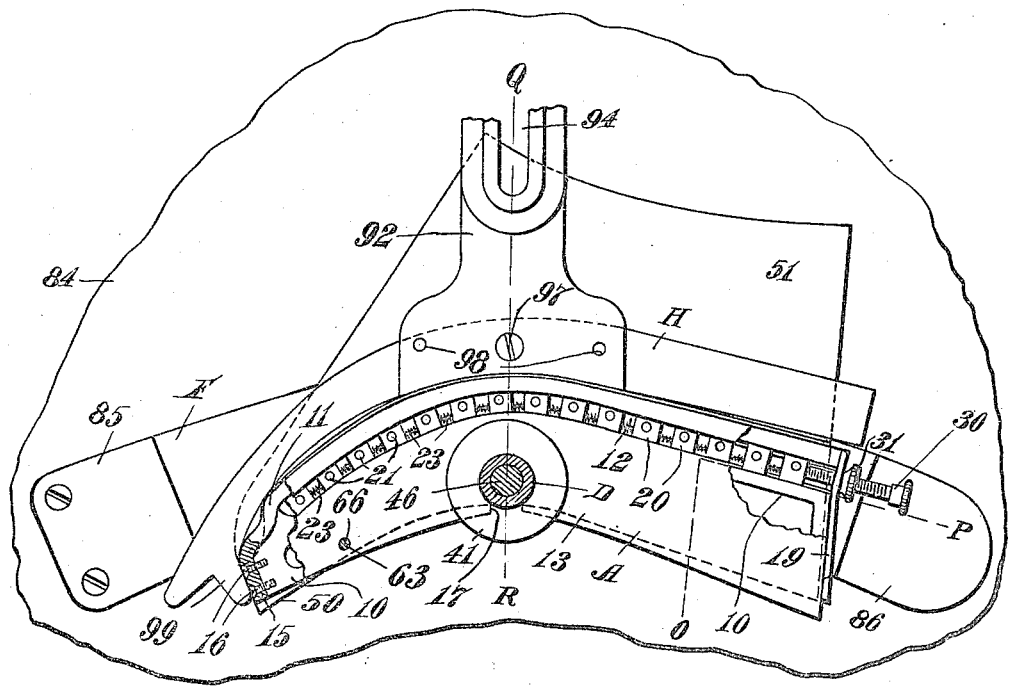
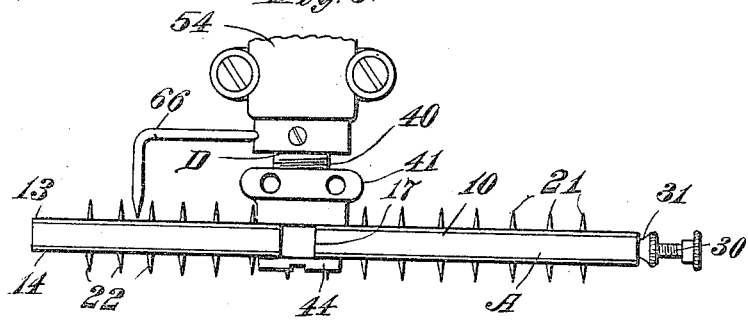
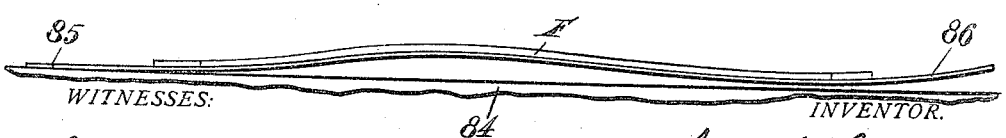

J. J. CASEY.
MARKING MACHINE FOR SHOE UPPERS.
APPLICATION FILED DEC. 19, 1913.

1,183,432.

Patented May 16, 1916.
6 SHEETS—SHEET 4.

WITNESSES:
Ludger A. Nicol.
Vera J. Dueuau.

INVENTOR:
James J. Casey
BY
Gardner W. Pearson
ATTORNEY.

J. J. CASEY.
MARKING MACHINE FOR SHOE UPPERS.
APPLICATION FILED DEC. 19, 1913.

1,183,432.

Patented May 16, 1916.
6 SHEETS—SHEET 6.

WITNESSES:
Sudger A. Nicol.
Vera J. Iverson.

INVENTOR:
James J. Casey
BY Gardner W. Pearson
ATTORNEY.

UNITED STATES PATENT OFFICE.

JAMES J. CASEY, OF BOSTON, MASSACHUSETTS, ASSIGNOR OF ONE-HALF TO GEORGE M. COBURN, OF BOSTON, MASSACHUSETTS.

MARKING-MACHINE FOR SHOE-UPPERS.

1,183,432.

Specification of Letters Patent.

Patented May 16, 1916.

Application filed December 19, 1913. Serial No. 807,691.

*To all whom it may concern:*

Be it known that I, JAMES J. CASEY, a citizen of the United States, residing at Boston, in the county of Suffolk and State of Massachusetts, have invented certain new and useful Improvements in Marking-Machines for Shoe-Uppers, of which the following is a specification.

This invention relates to machines for marking the positions of the buttons and the corresponding positions of the button holes of button shoes. The uppers of such shoes are usually formed of three pieces of leather. One piece which is known as the short quarter is to receive eventually along one edge the buttons and is stitched at the other edge to the large piece of leather which forms the long quarter so called. To the opposite edge of this long quarter is stitched another piece of leather known as the fly. The fly overlaps the short quarter and eventually has button holes formed in it with which the buttons on the short quarter should register.

The purpose of this machine is, after the upper is stitched together, to mark the location of the buttons on the short quarter and by the same movement to mark on the fly of the long quarter the position of the button holes. If the fly and short quarter are marked before they are stitched to the long quarter, the marks for the buttons and for the button holes will not always register, but with my device they cannot fail to register.

If desired the location of the button holes may be marked on the fly and then the location of the buttons on the short quarter before they are stitched to the long quarter, but I prefer to mark them after being stitched.

The blanks for the shoe uppers are usually sewed with what is to be the outside, on the inside so that they can be reversed when attached to the shoe. In the reversed position they lie flat against each other and the fly overlaps the short quarter in substantially the same position which it will occupy in the finished shoe except that all parts are reversed.

It is to be observed that the spaces between the buttons or button holes on shoes are substantially equal and the location and arrangement is the same on the right as it is on the left except that the short quarter and fly are on one side of the long quarter for one shoe and on the other side for the other shoe. If a right and left upper are laid flat on a table with the fly up, the curve or sweep made by the buttons and button holes is the same in each case but runs in an opposite direction. This curve or sweep is an irregular curve but runs substantially at an equal distance from the free edge of the fly. It will also be observed that in such shoes of different sizes the lower button is always substantially the same distance from the lower front corner of the short quarter and the same is true of the lower button hole on the fly. The changes in the sizes are substantially made at the top and the sweep of the button curve is substantially unchanged except that it is shortened from the top.

The free edge of the fly on the finished shoe when in place is on the outside and for the reasons stated may be used as the guide or line from which the position of the button holes may be adjusted or measured, and as the buttons must register with the button holes, both may be located from the said edge. By marking them, when they lie flat and are overlapped after being sewed to the long quarter, from a guide at said edge, all chance of false marking or registration is avoided.

With my device, all the buttons or all the button holes or preferably all the buttons and all the button holes may be marked with one movement or stroke of the machine.

With a slight adjustment by means of a set screw, my device can be set for marking different sizes within reasonable limits.

I prefer to use a reversible or invertible marking block which can be turned upside down and is therefore adapted to mark the right uppers on one surface and the left uppers on the other surface. If preferred, however, I may use two single sided marking blocks one arranged for the left and the other for the right upper. With the reversible block, no readjustment is necessary when changing from the right to the left or vice versa.

My marking block is compact, self-contained and quickly adjustable within the practical limits necessary. It is preferably operated from above and has awls of such length that they do not interfere with the fly guide. By using a padded protector of a certain shape for the long quarter, I protect the long quarter and provide a cushion for the awl points and one which needs no readjustment for rights or lefts.

While un-attached flies or short quarters can be marked separately, they preferably may be sewed to the long quarter and while all lie substantially flat, they can be marked together without injuring the long quarter.

My device can be very rapidly adjusted for different sizes within reasonable limits and can be reversed for rights or lefts with great ease. It can practically be used with a variety of sizes and styles which have substantially the same or similar curves on the outside edge of the fly and substantially similar sweep curves for the buttons.

By using a compact marking block operative from the top by direct action, my awls can readily be forced through two thicknesses or even more thicknesses of leather.

As the spaces between the buttons are substantially equal and the location and arrangement is the same on the right and left except that the curve formed by the buttons is in a different direction, I prefer to use a block with awls which protrude through both sides and which can therefore be used for marking the left and then reversed so as to mark the right.

My invention covers a block, preferably invertible, which has awls and awl blocks movable or slidable in a curved path therein and wherein the distances between adjoining marking awls can be increased or diminished simultaneously a substantially equal amount and thereby adjusted for the button positions or distances of different sized shoes.

Figure 5:
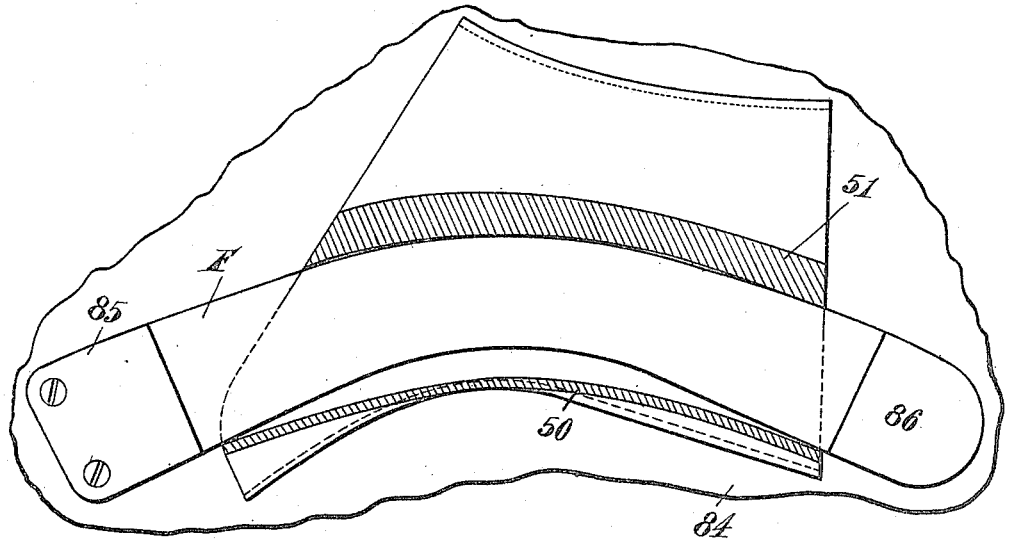
Figure 8:
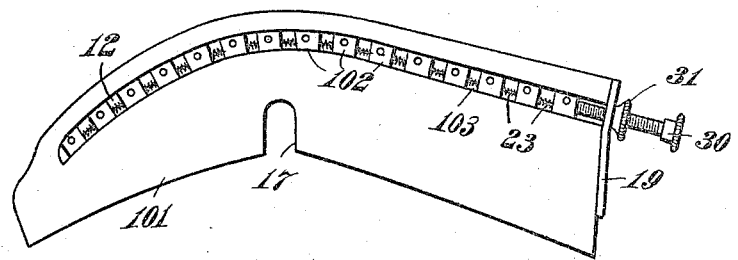
Figure 9:
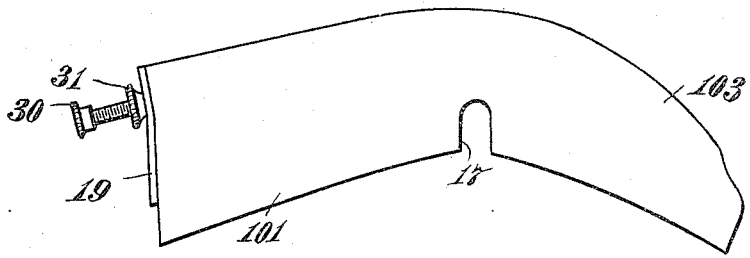
Figure 10:
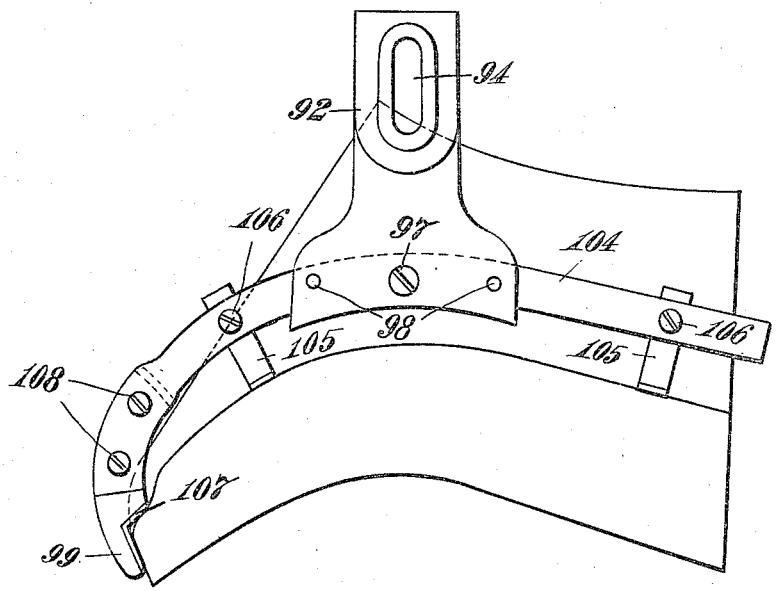
Figure 6:
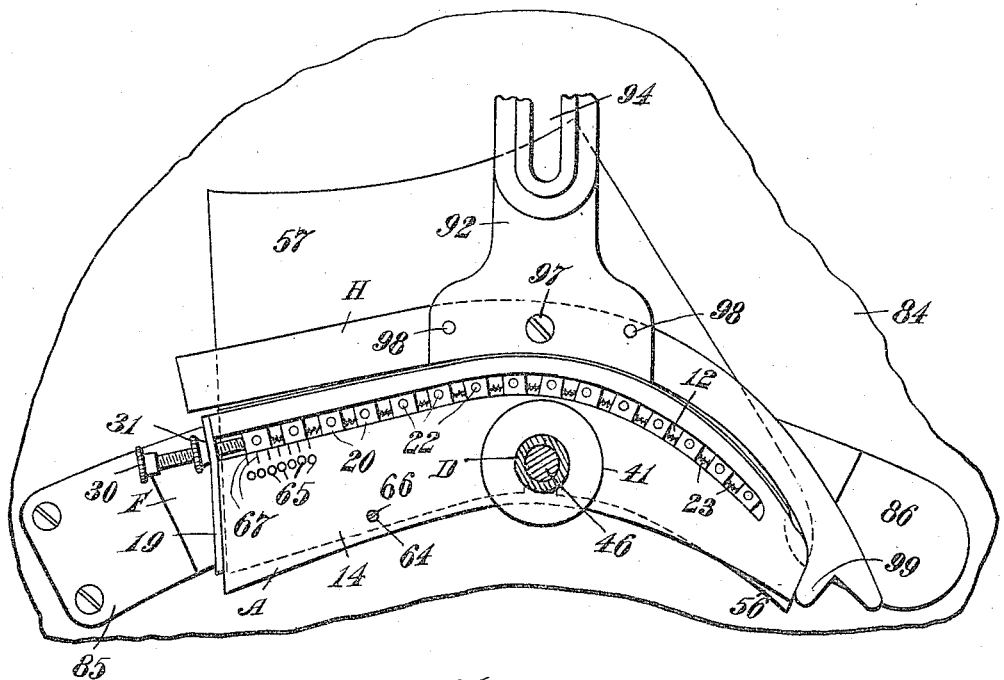
Figure 7:
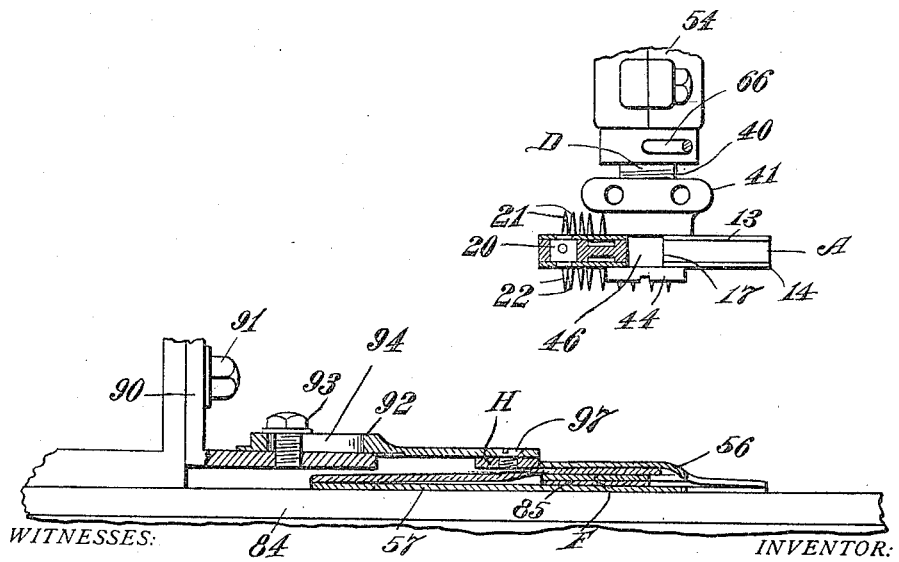
Figure 11:
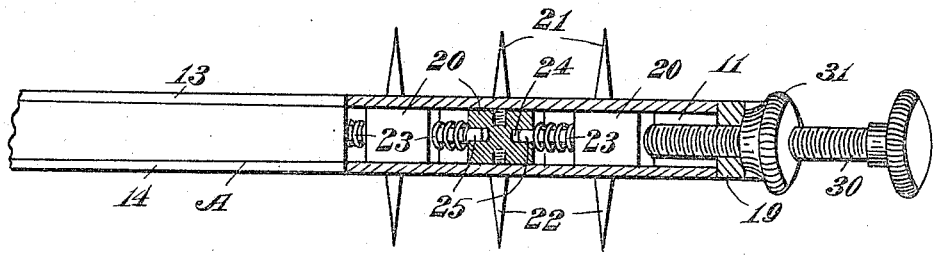
Figure 12:
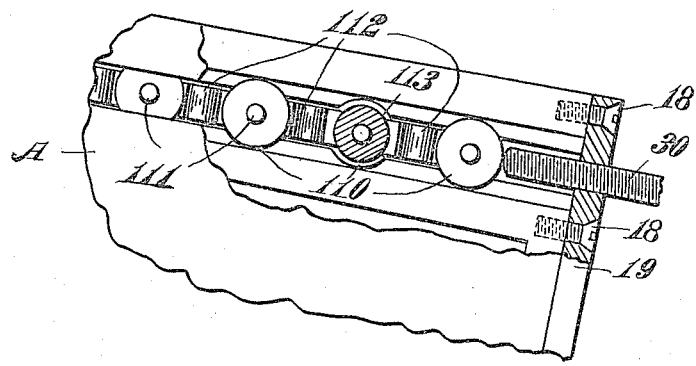

In the drawings, Figure 1 is a side elevation of a machine which I prefer to use for operating my device. Fig. 2 is a plan view on line X—Y of Fig. 1 showing a left upper in position to be marked. Fig. 3 is a front elevation of the marking block and adjoining portions of the operating machine. Fig. 4 is a plan view below line S—T of Fig. 1 with the bracket 90 and bolts 91 and 93 omitted. Fig. 5 is a sectional view looking down on line U—V of Fig. 1. Fig. 6 is a view similar to Fig. 2 showing the marking block and guide reversed for a right shoe. Fig. 7 is a sectional side elevation on the line Q—R of Fig. 2 looking from the left. Fig. 8 is a plan view of a single sided adjustable marking block for the left blank and Fig. 9 is a plan view of the back thereof. Fig. 10 is a plan view similar to Fig. 2 showing a different kind of fly guide. Fig. 11 is a detail of the awl blocks shown on line O—P of Fig. 2. Fig. 12 shows a modification of the blocks, Figs. 13, 14, side views of guides 105 and spring 112.

A form or pad is necessary over which to slip the upper blank as a protector for the long quarter and to receive the points of the awls. This may be of such shape that it will receive either a right or left so that it can be used without readjustment for both.

A is the marking block which is built up of a body 10 which is preferably of skeleton construction for the sake of lightness and which at one side about midway of its length is cut away at 17 to fit the punch member on the machine.

Attached to the convex edge of body 10 is a strip 11 which has a tang 15 at one end through which screws 16 pass into body 10 and which is attached to body 10 at the other end by means of a bar 19 and screws 18.

It is convenient to have the outer edge of strip 11 similar to the curve of the outer edge of the button hole fly of the upper, upon which it is intended to operate and it is convenient to have the inner edge of the guide to be described hereafter also near to or the same curve. The outer edge of the strip 11 may, however, be of different shape if desired. This strip is of such shape and is so attached that there is a channel 12 between it and body 10. Above and below strip 11 may, however, be of a different shape which conform to the outer shape thereof and which are so slotted that they project over channel 12 whereby the awl blocks 20 are confined and kept from falling out. These awl blocks fit slidably in channel 12 and carry at the top and bottom the awls 21 and 22 which project above and below the top and bottom parallel surface of marking block A.

I prefer to extend a guide pin from one side of each block loosely into a guide pin opening 24 in the adjoining block and over each guide pin to pass a compression spring 23. These compression springs may all be of equal strength but I find it more convenient to vary the strength thereof according to the distance from the set screw which passes through bar 19. I prefer to make one-third of the springs nearest the set screw the strongest, the middle third weaker and the last third weakest. By this arrangement, the awl blocks will always be kept at substantially equal distances one from the other whether the set screw is tightened or loosened. Any other method of attaining this result is equally satisfactory. The awl block farthest from the set screw is substantially fixed in position and does not move. This awl may be regarded as the point of rest or base for the adjustment.

Through the bar 19, I prefer to pass a thumb screw 30 with a check nut 31 which bears on one of the end awl blocks which adjoins it on its face which is opposite the springs 23, whereby by screwing adjusting screw 30 in or out that end awl block can be forced inward or permitted to be pressed out by the springs 23. By this means, the distance between the first and the last awl block may be reduced or increased and the other blocks will automatically place themselves equal distance between them. This is to adjust the marking blocks and thereby the marking awls for different sizes of shoes.

I prefer to use a punch member D which is threaded at 40 to receive tightening nut 41 and which below the tightening nut is of such size as to allow the cut away portion 17 of block A to fit snugly. At the bottom is a shallow annular shoulder 44 which prevents block A from slipping off. By loosening nut 41, block A can be removed or inserted either side up and can then be held in place by tightening nut 41.

The punch member D and other parts should be so adjusted and the awls 21 and 22 should be of such length that the points thereof will just touch the padded top of the quarter protector which I will describe.

The table or bed plate 84 is attached to the frame of the machine or otherwise, directly under the punch member D and to it at one side by means of suitable screws or otherwise is attached the quarter protector F. This is made of such shape and so located that it will be directly underneath the awls in the marking block either for a left or a right upper as will be seen by examining Figs. 2 and 6 wherein 50 represents the fly and 51 the short quarter of a left shoe, and 56 represents the fly and 57 the short quarter of a right shoe. This quarter protector is preferably of comparatively thin springy sheet metal substantially flat and preferably curved upward slightly from the end 85 which is fixed toward the free end then downward and up again to the free end 86 whereby a blank upper can be slipped over the end very easily. It is preferably covered on the top with leather or some suitable padding material for receiving the points of the marking awls and is of such shape that whichever side of the marking block is being used, the awls therein will strike the padded top thereof.

It is desirable if not necessary to use a guide for the upper such as shown at H. This guide H is carried by a slide 92 and is detachably attached thereto by means of a screw 97 and is steadied thereon by means of pins 98. This slide 92 has a slot 94 through which passes a bolt or screw 93 into the horizontal arm of a bracket 90 whereby slide 92 and guide H may be adjusted horizontally. The vertical arm of bracket 90 rests against a vertical face of the frame M of the machine and has a vertical slot not shown through which passes the bolt or screw 91 into said frame. Thereby bracket 90 carrying slide 92 and guide H may be adjusted vertically. This guide strip on the inside may correspond exactly with the free edge of the fly of the type of shoe to be operated on, and has at one end corresponding with the bottom of the fly, a tang 99 to which the bottom of the fly is intended to reach. Referring to Fig. 4, it will be seen that the upper can be accurately placed by means of the tang 99 and this guide strip.

To operate the punch D carrying block A, I prefer to use the mechanism shown in Fig. 1 wherein the frame M has an arm 58 to which is pivoted at 59 a lever 52 which connects with the top 53 of punch member D which is arranged to slide vertically in bearings 28 in another arm 54 of the frame.

An eccentric arm 55 is carried by an eccentric 60 which is normally loose on shaft 71 but which has a pawl 61 with a spring 62 which tends to force it into engagement with a dog 70 on power shaft 71 which is continually revolving in the direction of the arrow. When pawl 61 engages dog 70, arms 55 and 52 are operated and member D carrying block A is forced up and down. To engage or disengage pawl 61 with dog 70, I use a brake 80 normally kept by spring 81 out of the way of end 153 of pawl 61. This spring 81 connects a tail 152 of brake 80 with the bearing 29 fixed to frame M having vertical sliding member 82. This member 82 extends down through the frame M of the machine and may be depressed by hand. A spring 83 which surrounds member 82 and extends between the bottom flange 154 of frame M and collar 150 keeps member 82 normally in the up position where it is in the way of the nose 151 of the tail 152 of brake 80. In this position brake 80 depresses end 153 of pawl 61 thus keeping the other end lifted and out of engagement with dog 70. The top face of member 82 is curved as shown or beveled so that when it is depressed, it permits spring 81 to force nose 151 inward thus releasing brake 80 forcing it away from 153 and allowing pawl 61 to be engaged by dog 70 as power shaft 71 revolves thereby rotating eccentric 60. This rotation of eccentric 60 moves arms 55 and 52 up and down and reciprocates punch D. This reciprocation occurs when the parts are in the position shown by the dotted lines in Fig. 1. When in the position shown by the full lines, the dog 70 carried by power shaft 71 revolves with it but without actuating the punch member. When member 82 is released, spring 83 carries it upward and its top face being curved or beveled, forces nose 151 out of the way as it rises thus bringing brake 80 down into the path of end 153 of pawl 61 so that as the eccentric 60 revolves, the end 153 of pawl 61 strikes brake 80 thereby lifting the other end of the pawl away from dog 70. When the pawl and dog are thus disengaged, the reciprocation of the punch ceases.

To accurately place the marking block in the punch member, I prefer to use a bent pointed wire 66 fixed at one end to arm 54 and which extends downward adjoining the top of the marking block which has preferably holes 63 and 64 one at the top on one side and the other in a corresponding position on the other side when the block is reversed. By this means, the block may be placed accurately but at the same time may be moved if necessary. I also prefer to use a series of holes 65 through the marking block through which an awl or needle can be passed to verify the adjustment. These holes 65 pass through that end of block adjoining the thumb screw 30 which corresponds with the top of the upper from which the adjustment for size is made. These holes may be spaced according to sizes and in adjusting, the adjoining awl block with its awl can be moved opposite any particular hole and then an awl or needle can be slipped down through that hole vertically until it touches an upper whereby the operator can see where the marking block awl will strike without, however, depressing the marking block and marking all the button holes. Any other mechanism for operating my marking block may be used which permits the vertical reciprocation of the marking block at the will of the operator.

The device may be used without a placing guide for the upper as the outline thereof may be marked on the top of bed plate 84, or guide strip H may be left off and the edge of slide 92 may serve as a fly edge guide for the edge of the fly while the location of the ends may be marked on the quarter protector F. In fact any type of guide which does not interfere with the upper being slipped on to the quarter protector after it has been sewed together may be used.

As shown in Figs. 8 and 9, instead of a reversible marking block, I may use one such as 101 with slidable awl blocks 102 which have awls only on one side for the rights and a similar block for the lefts. This has a plain back plate 103.

If it is desired to punch only the flies or only the short quarters before the upper is sewed together, I may punch three or four at one time by placing one on top of the other.

If it is desired to change the number of buttons, for instance from fourteen to twelve, it is very easy to remove the bar 19 and take out two blocks with the corresponding awls. If it is desired to use sixteen buttons, two blocks may be added in a similar manner.

Instead of removing one or more awl blocks, ordinarily I may unscrew the awls from the blocks. For this reason I prefer to have a threaded hole at the top and bottom of each block and to thread the end of each awl to fit thereinto.

Figure 13:
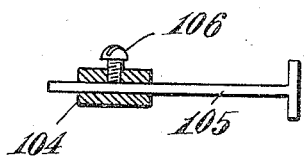

Referring to Figs. 2 and 6, it will be seen that to change from operating on a left to a right upper, it is not necessary to change the quarter protector F as this serves for either. In the first case the upper is pushed on from its bottom and in the other case from its top. The marking block A is taken out and reversed, however, and the guide strip or fly edge guide H must also be reversed to correspond with the marking block. This guide strip or fly edge guide H is preferably so shaped that it will be sufficiently accurate for a considerable number of sizes of the same style shoe and for a considerable number of styles which have substantially the same sweep. I may use, however, a different fly edge guide as for instance that shown in Fig. 10. This shows a narrow guide strip 104 attached to slide 92 by a screw 97 and steadied by pins 98. Through this guide strip 104 are horizontal slots through which are passed the shanks of T shaped guides 105. Screws 106 are screwed into guide strip 104 in such position as to each enter a slot and bear against a shank of a guide 105 as shown in Fig. 13. In one end of guide strip 104 is a slot into which fits a part of an end guide 107 and upon this end guide 107 through the guide strip 104 bear screws 108. By means of screws 106 the T shaped guides 105 may be adjusted back and forth and by means of the screws 108 the end guide 107 may be adjusted back and forth. The T shaped heads and the end of guide 107 are either so made or so adjusted that which ever side of the guide is uppermost, they will just reach down to the short quarter and serve as guides for the edge of the fly. By means of the adjustable bracket 90, slide 92 and adjustable T shaped guides 105, 105 and guide 107 almost any adjustment can be made according to the size and style of the shoe. Such a fly guide is reversible as is obvious.

Figure 14:
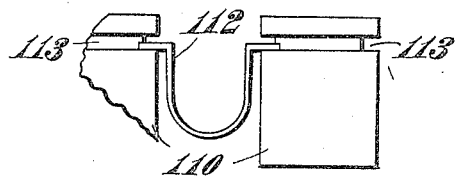

The guide pins 25 between the awl blocks 20 and 20 are convenient but not necessary as different forms or sizes of compression springs may be used as for instance that shown in Figs. 12 and 14. These springs 112 are of flat metal preferably U shaped and may have ends adapted to fit the awl blocks as described in the next paragraph.

Instead of substantially square awl blocks, I may use round blocks 110 as shown in Fig. 12 with awls 111 in the center thereof and spaced by U-shaped springs 112 which enter annular grooves 113 therein. With this construction the awl blocks can revolve and can readily take the curves of the slot in the marking block.

The principal feature of my invention is the compact and portable block which carries a plurality of blocks which carry awls, said blocks being relatively, or automatically adjustable simultaneously. Such a block, as is manifest, may be used for marking by hand but better results are obtained by the use of a machine with suitable guides and protectors.

For the usual styles and sizes of shoes two blocks are sufficient as it is not necessary that the fly edge guide and fly should exactly coincide. This fly edge guide should not be in contact with the bed plate but should be above and adjacent thereto at a point where its lower face will be a little above the level of the top face of the quarter protector when in position.

The fly guide should not be thick enough to be hit by the bottom of the marking block when it comes down and the awls should be long enough to pass down below the fly guide to do their work.

On account of the length of the awls, I find it an aid to use the holes 65 which are arranged according to sizes and preferably have lines 67 which extend over to channel 12 for convenience in adjusting for different sizes.

I prefer to use a thin flat elastic metallic quarter protector substantially of the shape shown in the drawings, attached at one end to the bed plate so that it normally rests thereon. Such a quarter protector with a suitable pad is very necessary if the marking block is used by hand, to limit the penetration of the awls. It is convenient in any case as it prevents any possible injury to the long quarter and aids in stripping the points of the awls when they are retracted.

If the throw of the punch and the position of the points of the awls are carefully adjusted however, they can be so positioned that on the down stroke they will just pass through the fly and into the short quarter without passing through the short quarter. The position of the bottom holes is thus marked on the fly and the position of the buttons on what in the finished shoe is the back of the short quarter. I prefer, however, to use the quarter protector and also to make the machine adjustable as for instance by means of an adjustable eccentric such as 59 at the point where power arm 52 is pivoted to arm 58. Any other method of adjustment may be used, however, as for instance the annular shoulder 44 may be the head of a screw with a shank 46 which enters the bottom of punch member D. Thereby marking block A may be vertically adjusted.

I claim:

1. In a marking device for shoe uppers, a detachable and invertible substantially flat marking block having a curved channel, a plurality of awl blocks slidable therein, a plurality of awls removably carried by the awl blocks, and means for simultaneously adjusting the relative position of the awl blocks.

2. In a marking device for shoe uppers, a marking block having a curved channel, a plurality of awl blocks slidable therein, a plurality of awls carried by the awl blocks which project beyond the surface of the marking block, and springs between the awl blocks, together with an adjusting screw which bears against that face of an end awl block which is opposite from the springs as described.

3. In a marking device for shoe uppers, the combination of a frame, a bed plate carried thereby, a vertically reciprocating punch member carried by the frame in operative relation with the bed plate, a marking block detachably carried by the punch member having awls which project downward, and a thin, smooth, substantially flat quarter protector attached at one end to the bed plate and adapted to be engaged by the awls of the marking block, together with means for reciprocating the punch member as described.

4. In a marking device for shoe uppers, a substantially flat marking block having a curved channel, a plurality of awl blocks slidable therein each awl block having two awls which project from the opposite faces thereof beyond the surfaces of the marking block, and springs between the awl blocks, together with an adjusting screw which bears against that face of an end awl block which is opposite from the springs as described.

5. In a marking device for shoe uppers, the combination of a frame, a bed plate carried thereby, a vertically reciprocating punch member carried by the frame in operative relation with the bed plate, a detachable marking block having a cut-away portion on one side to fit the punch member and having a plurality of awls which project from the top and bottom thereof, and a tightening nut on the punch member in operative relation with the marking block whereby it may be removed or inserted either side up and held in place as described.

6. In a marking device for shoe uppers, the combination of a frame, a bed plate carried thereby, a vertically reciprocating punch member carried by the frame in operative relation with the bed plate, a marking block carried by the punch member having slidable awl blocks and awls carried thereby said awl blocks being simultaneously adjustable relative to each other, together with a thin flat elastic quarter protector attached at one end to the bed plate so as to be adjacent thereto.

7. In a marking device for shoe uppers, the combination of a frame, a bed plate carried thereby, a vertically reciprocating punch member carried by the frame in operative relation with the bed plate, a marking block carried by the punch member having slidable awl blocks and awls carried thereby said awl blocks being simultaneously adjustable relative to each other, together with a thin flat elastic quarter protector attached at one end to the bed plate so as to be adjacent thereto in operative relation with said awls, and a fly edge guide above and adjacent to the bed plate as described.

8. In a marking device for shoe uppers, the combination of a frame, a bed plate carried thereby, a vertically reciprocating punch member carried by the frame in operative relation with the bed plate, a reversible and detachable marking block carried by the punch member and having slidable awl blocks and awls carried thereby on opposite sides thereof said awl blocks being simultaneously adjustable relative to each other, together with a thin flat elastic quarter protector attached to and adjacent to the bed plate.

9. In a marking device for shoe uppers, the combination of a frame, a bed plate carried thereby, a vertically reciprocating punch member carried by the frame in operative relation with the bed plate, a reversible and detachable marking block carried by the punch member and having slidable awl blocks and awls carried thereby which project in opposite directions therefrom said awl blocks being simultaneously adjustable relative to each other, together with a thin flat elastic quarter protector attached at one end to the bed plate and having a pad on the upper surface adapted to engage the awls on either side of the marking block, and a fly edge guide above and adjacent to the bed plate as described.

10. In a marking device for shoe uppers, the combination of a frame, a bed plate carried thereby, a vertically reciprocating punch member carried by the frame in operative relation with the bed plate, a reversible and detachable marking block carried by the punch member and having slidable awl blocks and awls carried thereby which project in opposite directions therefrom said awl blocks being simultaneously adjustable relative to each other, together with a thin flat elastic quarter protector attached at one end to the bed plate and having a pad on the upper surface adapted to engage the awls on both sides of the marking block, a fly edge guide above and adjacent to the bed plate, and means for reciprocating the punch member as described.

11. In a marking device for shoe uppers, the combination of a frame, a bed plate carried thereby, a vertically reciprocating punch member carried by the frame in operative relation with the bed plate, a reversible and detachable marking block carried by the punch member and having slidable awl blocks and awls carried thereby which project in opposite directions therefrom said awl blocks being simultaneously adjustable relative to each other, together with a thin flat elastic quarter protector attached at one end to the bed plate and having a pad on the upper surface adapted to engage the awls on both sides of the marking block, a fly edge guide above and adjacent to the bed plate, means for reciprocating the punch member, and a tightening nut carried by the punch member in operative relation with the marking block.

12. In a marking device for shoe uppers, the combination of a frame, a bed plate carried thereby, a vertically reciprocating punch member carried by the frame in operative relation with the bed plate, a reversible marking block detachably carried by the punch member having slidable awl blocks and awls so carried thereby that they project from the upper and lower faces of the marking block said awl blocks being simultaneously adjustable relative to each other, together with a reversible fly edge guide carried by the frame above and adjacent to the bed plate, and a thin flat elastic quarter protector attached at one end to the bed plate so as to be adjacent thereto.

13. In a marking device for shoe uppers, a marking block having substantial parallel top and bottom surfaces and a curved channel, a plurality of awl blocks slidable in said channel, a plurality of awls carried by the awl blocks and which project beyond the surface of said marking block, and means between said top and bottom surfaces for simultaneously adjusting the relative position of the awl blocks.

14. In a marking device for shoe uppers, a marking block having a curved channel, a plurality of awl blocks slidable therein, a plurality of awls carried by the awl blocks which project beyond the surface of the marking block, and springs between the awl blocks, together with means for forcing the awl blocks together against the pressure of said springs as described.

15. In a marking device for shoe uppers, a marking block having substantially parallel top and bottom surfaces and a curved channel open at one end, means for closing said end, and a plurality of awl blocks slidable in said channel, together with a plurality of awls carried by the awl blocks and which project beyond the surface of said marking block.

16. In a marking device for shoe uppers, a marking block having substantially parallel top and bottom surfaces and a curved channel open at one end, a bar which extends across said end and is detachably attached to the marking block, and a plurality of awl blocks slidable in said channel, together with a plurality of awls carried by the awl blocks and which project beyond the surface of said marking block.

17. In a marking device for shoe uppers, a substantially flat marking block having a curved channel which has a closed end and an open end, means for closing the open end of said channel, a plurality of awl blocks slidable in and entirely inside of said channel, a plurality of awls carried by the awl blocks, and means for simultaneously adjusting the relative position of the awl blocks.

18. In a marking device for shoe uppers, a marking block having substantially parallel top and bottom surfaces and a curved channel open at one end, a bar which extends across said end and is detachably attached to the marking block, and a plurality of awl blocks slidable in said channel, together with a plurality of awls carried by the awl blocks and which project beyond the surface of said marking block, and means which extend through said bar and into said channel for simultaneously adjusting the relative position of the awl blocks.

19. In a marking device for shoe uppers, a substantially flat marking block comprising a body with substantially parallel top and bottom surfaces and a curved edge, a strip so attached as to form with the curved edge of the body a channel open at one end, a bar detachably attached to the strip and body across the open end of said channel, and top and bottom plates attached at the top and bottom of the body each so slotted as to extend over each side of said channel between the strip and body as described.

20. In a marking machine for shoe uppers, a marking block with substantially parallel top and bottom surfaces and a curved channel therein, a plurality of awl blocks slidable in said channel and each having an awl which projects beyond the top surface and another awl which projects beyond the bottom surface, means for simultaneously adjusting the relative position of the awl blocks said means being included between the top and bottom surfaces of the awl block, together with block carrying and operating mechanism, said block being bodily movable from said mechanism as a unitary structure.

21. In a marking device for shoe uppers, the combination of a frame, a bed plate carried thereby, a vertically reciprocating punch member carried by the frame in operative relation with the bed plate, a reversible marking block detachably carried by the punch member having awls which project in opposite directions, together with a thin substantially flat quarter protector attached at one end to the bed plate and adapted to engage the awls on both sides of the marking block, and means for reciprocating the punch member as described.

22. In a marking device for shoe uppers, a marking block having a curved channel, a plurality of awl blocks slidable therein, a plurality of awls carried by the awl blocks which project beyond the surface of the marking block, and springs of varying strength between adjoining awl blocks, together with means for forcing the awl blocks together against the pressure of said springs as described.

In testimony whereof I hereto affix my signature in presence of two witnesses.

JAMES J. CASEY.

Witnesses:
EDWARD L. HOPKINS,
GARDNER W. PEARSON.